US011900667B2

(12) United States Patent
Shoshan et al.

(10) Patent No.: US 11,900,667 B2
(45) Date of Patent: Feb. 13, 2024

(54) PARAMETRIC CURVES BASED DETECTOR NETWORK

(71) Applicant: International Business Machines Corporation, Armonk, NY (US)

(72) Inventors: Yoel Shoshan, Haifa (IL); Vadim Ratner, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 17/242,331

(22) Filed: Apr. 28, 2021

(65) Prior Publication Data

US 2022/0350988 A1      Nov. 3, 2022

(51) Int. Cl.
*G06V 20/00*     (2022.01)
*G06V 10/44*     (2022.01)
*G06V 10/46*     (2022.01)
*G06V 10/82*     (2022.01)
*G06F 18/22*     (2023.01)
*G06F 18/213*    (2023.01)
*G06N 7/01*      (2023.01)

(52) U.S. Cl.
CPC ............ *G06V 20/00* (2022.01); *G06F 18/213* (2023.01); *G06F 18/22* (2023.01); *G06N 7/01* (2023.01)

(58) Field of Classification Search
None
See application file for complete search history.

(56) References Cited

U.S. PATENT DOCUMENTS

| 10,289,925 B2 | 5/2019 | Farooqi | |
| 10,499,857 B1 * | 12/2019 | Nguyen | G06N 3/045 |
| 2010/0135529 A1 * | 6/2010 | Li | G06T 7/11 |
| | | | 382/103 |

(Continued)

FOREIGN PATENT DOCUMENTS

| CN | 111260724 A | 6/2020 | |
| WO | WO-2015072859 A1 * | 5/2015 | G06F 17/10 |

(Continued)

OTHER PUBLICATIONS

Mandal, Soham & Uhlmann, Virginie. (Jan. 11, 2020). A Learning-Based Formulation of Parametric Curve Fitting for Bioimage Analysis. DOI: 10.1101/2020.01.10.901702, bioRxiv, https://www.biorxiv.org/content/10.1101/2020.01.10.901702v1.full.

(Continued)

*Primary Examiner* — Mohammed Rachedine
(74) *Attorney, Agent, or Firm* — Stephanie L. Carusillo

(57) ABSTRACT

Embodiments may provide improved techniques for object detection so as to improve the finding of objects and the accuracy of the boundary predictions using parametric curves defined by multiple control points. For example, in an embodiment, a method may be implemented in a computer system comprising a processor, memory accessible by the processor, and computer program instructions stored in the memory and executable by the processor, the method may comprise receiving an image, extracting from the image a plurality of features related to objects shown in the image, generating, from the extracted features, at least one plurality of points representing a parametric curve bounding an object shown in the image; and outputting the plurality of points representing the parametric curve.

17 Claims, 4 Drawing Sheets

(56) References Cited

U.S. PATENT DOCUMENTS

| | | | |
|---|---|---|---|
| 2016/0259961 A1* | 9/2016 | Vugdelija | ............... G06V 40/19 |
| 2020/0218909 A1 | 7/2020 | Myeong | |
| 2022/0096157 A1* | 3/2022 | Pollock | .................. G16H 20/40 |

FOREIGN PATENT DOCUMENTS

| | | | | |
|---|---|---|---|---|
| WO | WO-2018144678 A1 * | 8/2018 | ............. | A61B 10/00 |
| WO | WO-2020002704 A1 * | 1/2020 | ............. | G01N 23/04 |

OTHER PUBLICATIONS

Liu, Yuliang & Chen, Hao & Shen, Chunhua & Tong, He & Jin, Lianwen & Wang, Liangwei. (Jun. 2020). ABCNet: Real-Time Scene Text Spotting With Adaptive Bezier-Curve Network. 9806-9815. DOI: 10.1109/CVPR42600.2020.00983.

Lu, Yao & Bai, Xue & Shapiro, Linda & Wang, Jue. (Jun. 2016). Coherent Parametric Contours for Interactive Video Object Segmentation. 642-650. DOI: 10.1109/CVPR.2016.76.

Smirnov, Dmitriy & Fisher, Matthew & Kim, Vladimir & Zhang, Richard & Solomon, Justin. (Jun. 2020). Deep Parametric Shape Predictions Using Distance Fields. 558-567. DOI: 10.1109/CVPR42600.2020.00064.

Gao, Jun & Tang, Chengcheng & Ganapathi-Subramanian, Vignesh & Huang, Jiahui & Su, Hao & Guibas, Leonidas. (Jan. 12, 2019). DeepSpline: Data-Driven Reconstruction of Parametric Curves and Surfaces, ArXiv.org, https://arxiv.org/abs/1901.03781.

G. G. Demisse, D. Aouada and B. Ottersten, "Similarity Metric for Curved Shapes in Euclidean Space," 2016 IEEE Conference on Computer Vision and Pattern Recognition (CVPR), Las Vegas, NV, USA, 2016, pp. 5042-5050, doi: 10.1109/CVPR.2016.545.

Haichun Yang, et al., CircleNet: Anchor-free Detection with Circle Representation, arXiv:2006.02474v1 [cs.CV] Jun. 3, 2020.

* cited by examiner

PARAMETRIC CURVES BASED DETECTOR NETWORK

BACKGROUND

The present invention relates to techniques for object detection so as to improve the finding of objects and the accuracy of the boundary predictions using parametric curves defined by multiple control points.

Machine learning based object detectors provide object prediction using AABBs (axis aligned bounding boxes). On the other hand, machine learning based image segmentation models provide pixel (or near-pixel) level classes prediction. A main disadvantage of such detectors are that AABBs do not capture well the shape of many actual objects. The main disadvantages of segmentation models are that a) a pixel level object is not always well defined as boundaries are not always clear (for example, in medical applications), and a single pixel may "belong" to multiple classes as they are blended together and more importantly b) it is hard to express object importance—as in some applications adding 5 correct pixels to an already found object is significantly less important than finding 5 correct pixels of a new object, which has not yet been found (known as "Object importance").

Object detection performance may be measured as a combination of: 1) What objects were found at all, and 2) How tight and correct was the boundary prediction. Usually both parameters are combined by defining an object shape matching criterion, which is compared a prediction to an actual object ground-truth boundary, and if similarity of the comparison falls below a certain threshold, is considered a miss.

Accordingly, a need arises for improved techniques for object detection so as to improve the finding of objects and the accuracy of the boundary predictions.

SUMMARY

Embodiments may provide improved techniques for object detection so as to improve the finding of objects and the accuracy of the boundary predictions using parametric curves defined by multiple control points. For example, embodiments may provide significantly tighter boundary predictions for objects, while representing object importance correctly. Instead of predicted 4 values per object, which represent tweaking of AABB location, embodiments may instead predict K curve control points. This strikes a better balance between finding objects and describing their shape, which may result in superior object detection performance. In addition, embodiments may provide object shape regularization. Additionally, the small number of control points which are able to represent diverse shape boundaries are superior to techniques which attempt to predict polygon shapes, since a polygon may contain many vertices, and the model is more likely to overfit.

For example, in an embodiment, a method may be implemented in a computer system comprising a processor, memory accessible by the processor, and computer program instructions stored in the memory and executable by the processor, the method may comprise receiving an image, extracting from the image a plurality of features related to objects shown in the image, generating, from the extracted features, at least one plurality of points representing a parametric curve bounding an object shown in the image; and outputting the plurality of points representing the parametric curve.

In embodiments, extracting the plurality of features may be performed using a regression model. The method may comprise optimizing a match between ground truth objects and predicted anchors using a loss function. The loss function may comprise one of a curve similarity metric, calculated at either curve-space or at a selected finite resolution of the curve, comprising at least one of a Fréchet distance, Hausdorff distance, Bottleneck distance, and a Lie Algebra based metric. The method may comprise optimizing weights of the regression model using a curve distance metric. The generating may comprise generating a plurality of points representing a plurality of parametric curves bounding the objects shown in the image. The plurality of parametric curves may be spread to cover the entire received image, with overlapping.

In an embodiment, a system may comprise a processor, memory accessible by the processor, and computer program instructions stored in the memory and executable by the processor to perform receiving an image, extracting from the image a plurality of features related to objects shown in the image, generating, from the extracted features, at least one plurality of points representing a parametric curve bounding an object shown in the image; and outputting the plurality of points representing the parametric curve.

In an embodiment, a computer program product may comprise a non-transitory computer readable storage having program instructions embodied therewith, the program instructions executable by a computer, to cause the computer to perform a method comprising receiving an image, extracting from the image a plurality of features related to objects shown in the image, generating, from the extracted features, at least one plurality of points representing a parametric curve bounding an object shown in the image; and outputting the plurality of points representing the parametric curve.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may provide improved techniques for object detection so as to improve the finding of objects and the accuracy of the boundary predictions using parametric curves defined by multiple control points. For example, embodiments may provide significantly tighter boundary predictions for objects, while representing object importance correctly. Instead of predicted 4 values per object, which represent tweaking of AABB location, embodiments may instead predict K curve control points. This strikes a better balance between finding objects and describing their shape, which may result in superior object detection performance.

In addition, embodiments may provide object shape regularization. Additionally, the small number of control points which are able to represent diverse shape boundaries are superior to techniques which attempt to predict polygon shapes, since a polygon may contain many vertices, and the model is more likely to overfit.

Figure 1:
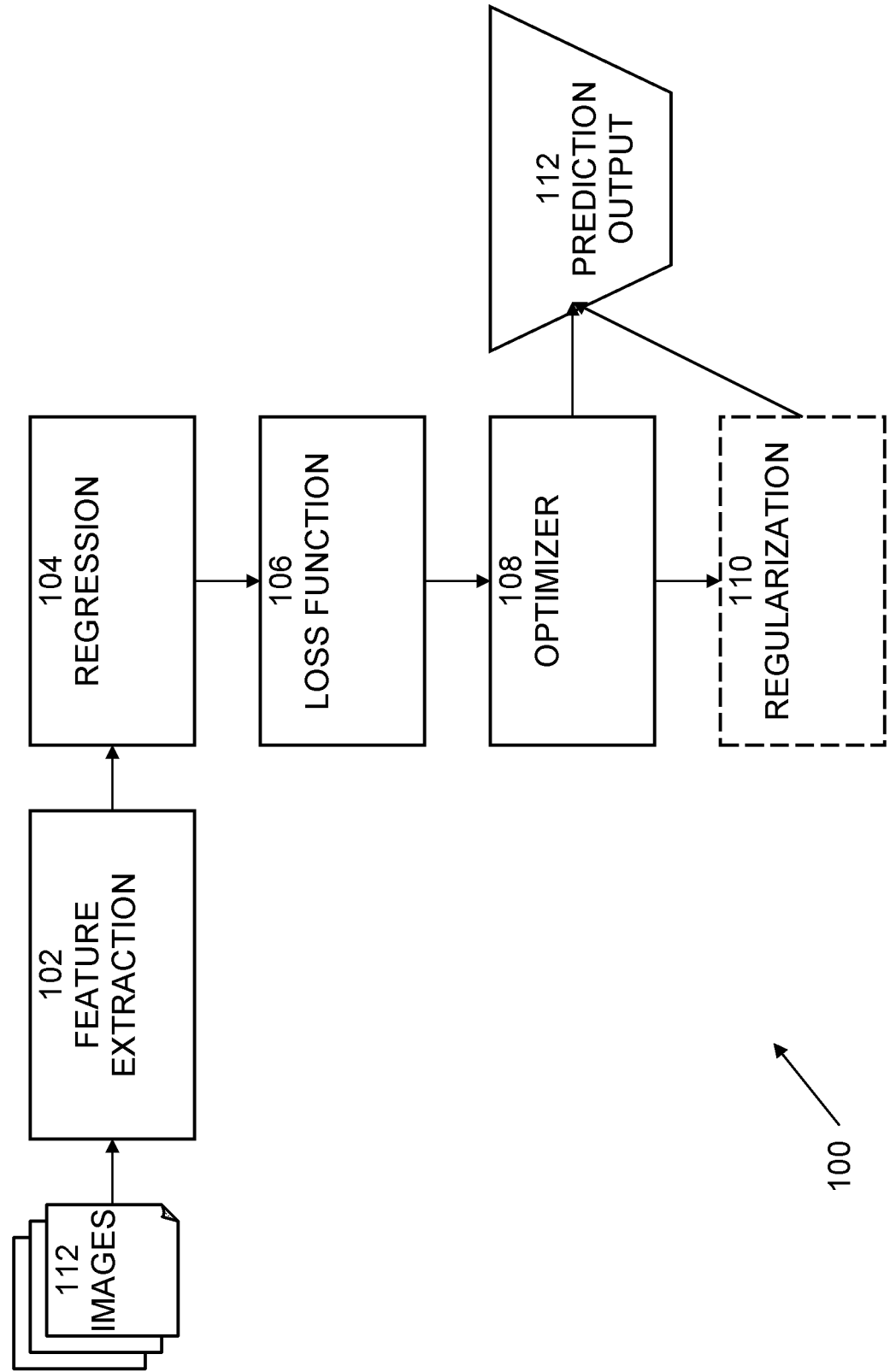
FIG. 1 illustrates an exemplary embodiment of a neural network architecture, according to embodiments of the present techniques.
Figure 2:
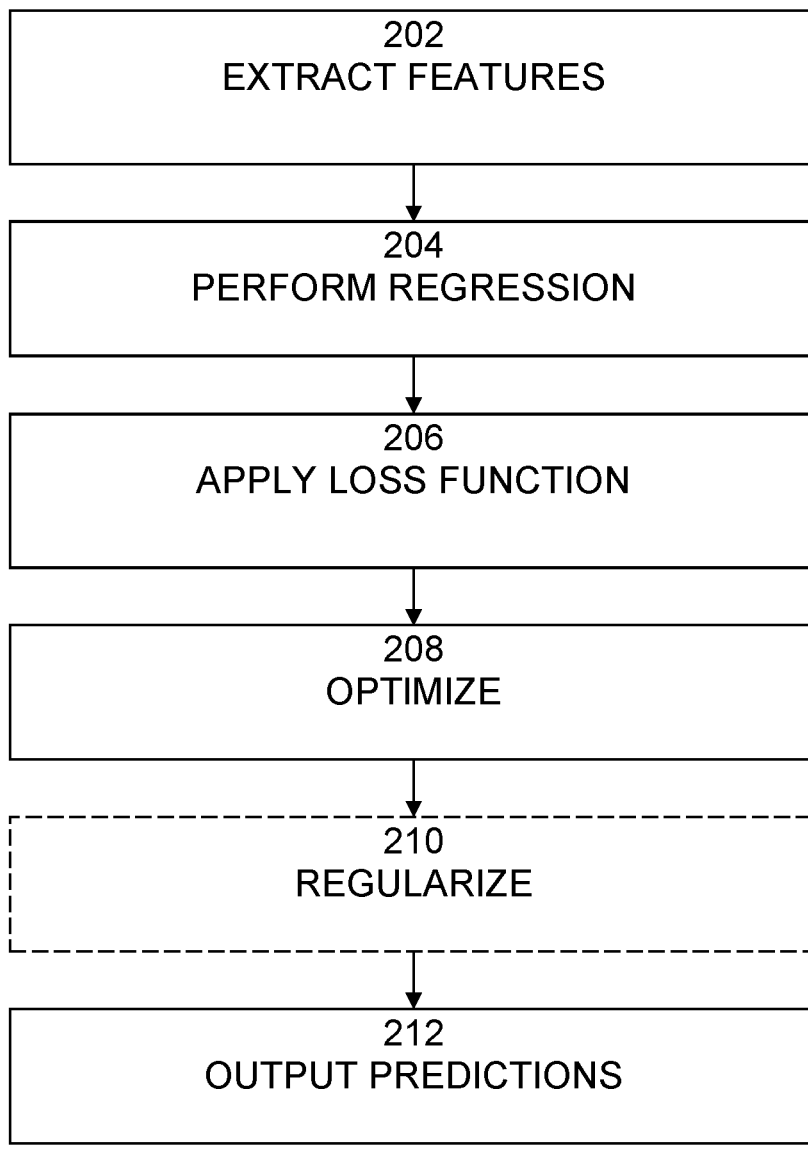
FIG. 2 an exemplary flow diagram of a process of object detection in neural network architecture, according to embodiments of the present techniques.

An exemplary embodiment of a neural network architecture 100 is shown in FIG. 1. It is best viewed in conjunction with FIG. 2, which is an exemplary flow diagram of a process 200 of object detection in neural network architecture 100. In this example, architecture 100 may include feature extraction sub-module 102, at least one regression head 104, defined loss function 106, optimizer 108, and regularization 110. Process 200 begins with 202 in which feature extraction sub-module 103 may extract pertinent features, such as features related to objects shown in the image, termed "MAIN FEATURES", from each input image 112. At 204, regression model head or heads 104 may take as input the extracted MAIN FEATURES and may output points, such as N anchor points×C control points, representing one or more parametric curves, potentially bounding objects in the current image. At 206, loss function 106 may be applied. Loss function 106 may be a defined loss function (or subterm), which seeks to optimize a match between ground truth objects and predicted anchors. At 208, optimizer 108 may optimize the model weights according to the defined loss function. Optimizer 108 may use any curve distance metric, such as Fréchet distance, Hausdorff distance, Bottleneck distance, a Lie Algebra based metric, etc. A selected finite resolution of the curve can also be used, allowing utilization of polygon-based metrics as well. (Note, this is not equivalent to a network outputting polygons directly.) At 210, optional regularization term 110 may influence the shape characteristics of the predicted parametric curves. Such characteristics may include smoothness, convexity, etc. At 212, predicted output points 112 representing one or more parametric curves and potentially bounding objects in the current image, may be output.

Figure 3:
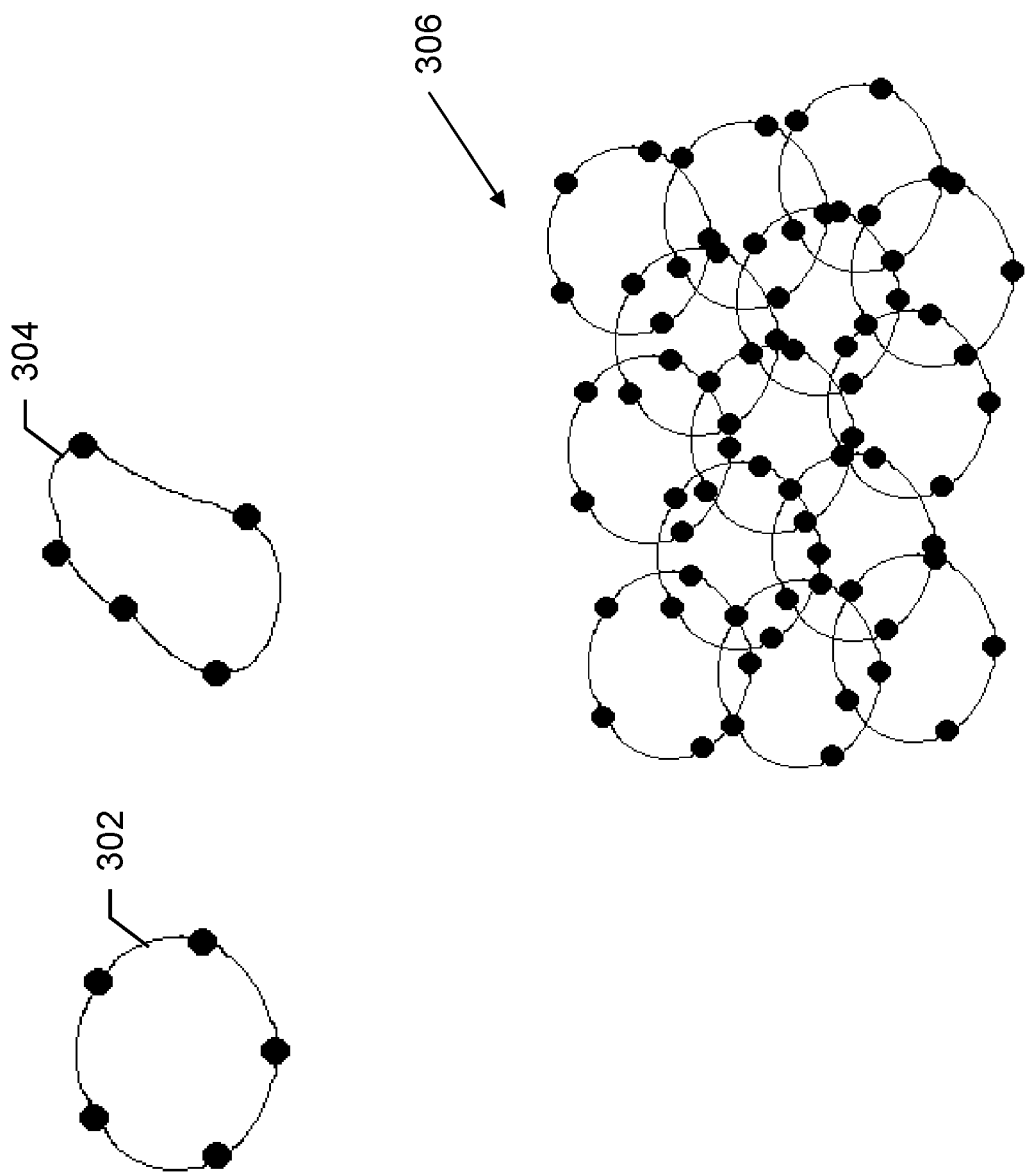
FIG. 3 is an exemplary illustration of anchor and control points defining predicted parametric curves, according to embodiments of the present techniques.

Examples of anchor and control points defining predicted parametric curves, as output from process 200, are shown in FIG. 3. In this example, each anchor, representing a potential detection, may start with a default 302. The control points are part of the per-anchor prediction of the model, allowing it to express more complex shapes, using very few numerical values. For example, anchor 302 is merely a default anchor. Other anchors may have more complex shapes with the same number of control points, such as anchor 304. Process 200 may predict anchors 306 that are spread to cover the entire input image, with overlapping. Optimizer 108 and/or regularization term 110 may modify the shapes 304 of one or more anchors from the default shape 302.

Figure 4:
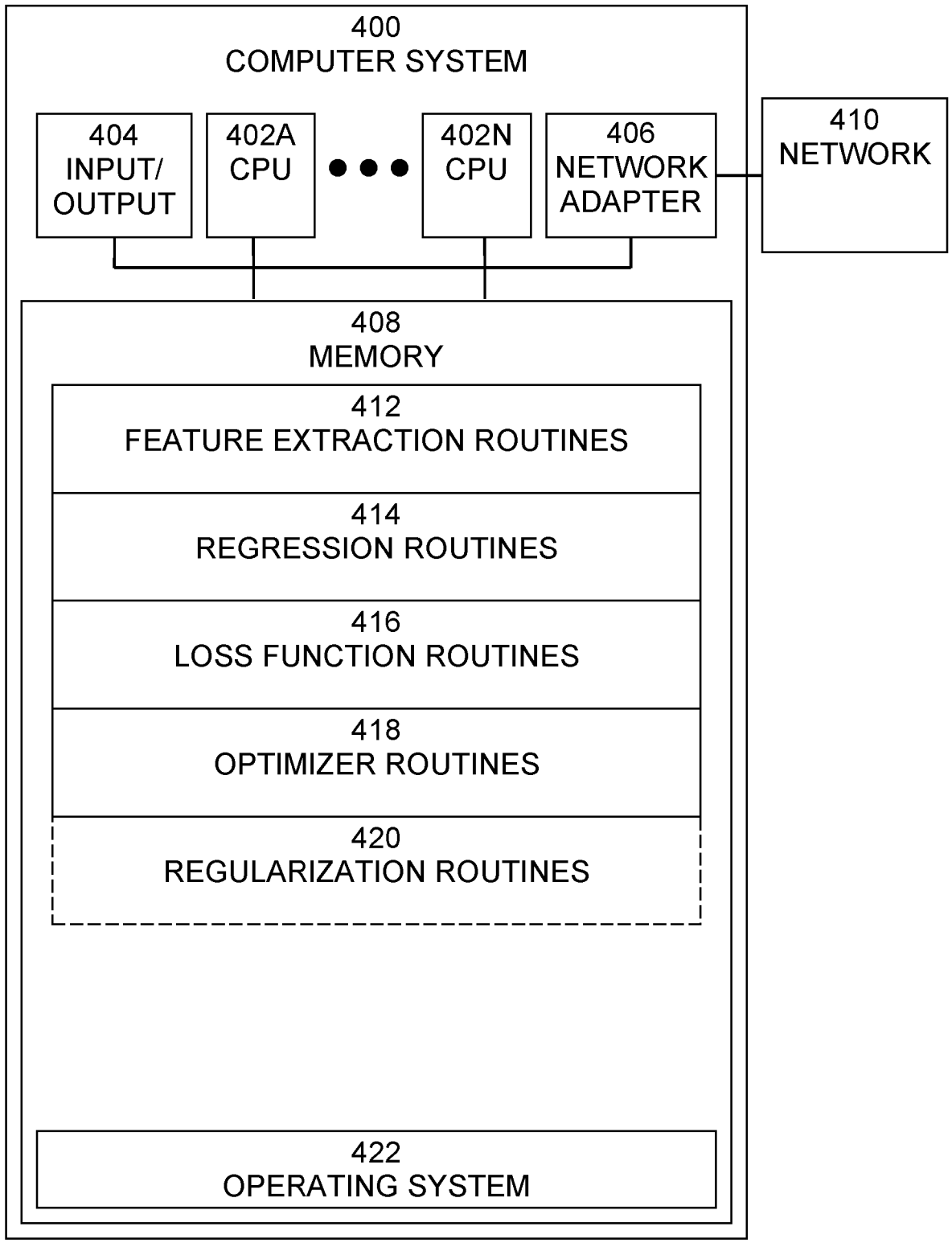
FIG. 4 is an exemplary block diagram of a computer system, in which processes involved in the embodiments described herein may be implemented.

An exemplary block diagram of a computer system 400, in which processes and components involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include feature extraction routines 412, regression routines 414, loss function routines 416, optimizer routines 418, regularization routines 420, and operating system 422. Feature extraction routines 412 may include software to extract features, as described above. Regression routines 414 may provide regressions, as described above. Loss function routines 416 may include software to calculate a loss function, as described above. Operating system 422 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
   receiving an image;
   extracting from the image a feature related to an object shown in the image;
   generating, from the extracted feature and a plurality of default anchor points, at least one selected plurality of control points and at least one selected plurality of anchor points, the at least one selected plurality of control points and the at least one selected plurality of anchor points together representing at least one parametric curve bounding the object shown in the image, wherein a number of the at least one selected plurality of control points is small; and
   outputting the at least one selected plurality of control points and the at least one selected plurality of anchor points representing the at least one parametric curve.

2. The method of claim 1, wherein extracting the feature is performed using a regression model.

3. The method of claim 2, further comprising: optimizing a match between a ground truth of the object shown in the image and the at least one predicted parametric curve defined by the at least one selected plurality of anchor points and by the at least one selected plurality of control points using a loss function and varying the locations of the at least one selected plurality of anchor points and varying the values of the at least one selected plurality of control points.

4. The method of claim 3, wherein the loss function comprises one of a curve similarity metric calculated at either curve-space or a curve similarity metric calculated at a selected finite resolution of the at least one parametric curve, comprising at least one of a Frechet distance, a Hausdorff distance, a Bottleneck distance, and a Lie Algebra based metric.

5. The method of claim 3, further comprising: optimizing weights of the regression model using a curve distance metric.

6. The method of claim 1, wherein the plurality of default anchor points and a plurality of control points define an initial plurality of parametric curves spread to cover the entire received image, and wherein the initial plurality of parametric curves includes at least some parametric curves which overlap.

7. A system comprising a processor, memory accessible by the processor, and computer program instructions stored in the memory and executable by the processor to perform:
   receiving an image;
   extracting from the image a feature related to an object shown in the image;
   generating, from the extracted feature and a plurality of default anchor points, at least one selected plurality of control points and at least one selected plurality of anchor points, the at least one selected plurality of control points and the at least one selected plurality of anchor points together representing at least one parametric curve bounding the object shown in the image, wherein a number of the at least one selected plurality of control points is small; and
   outputting the at least one selected plurality of control points and the at least one selected plurality of anchor points representing the at least one parametric curve.

8. The system of claim 7, wherein extracting the plurality of feature is performed using a regression model.

9. The system of claim 8, further comprising: optimizing a match between a ground truth of the object shown in the image and the at least one predicted parametric curve defined by the at least one selected plurality of anchor points and by the at least one selected plurality of control points using a loss function and varying the locations of the at least one selected plurality of anchor points and varying the values of the at least one selected plurality of control points.

10. The system of claim 9, wherein the loss function comprises one of a curve similarity metric calculated at curve-space or a curve similarity metric calculated at a selected finite resolution of the at least one parametric curve, comprising at least one of a Frechet distance, a Hausdorff distance, a Bottleneck distance, and a Lie Algebra based metric.

11. The system of claim 9, further comprising: optimizing weights of the regression model using a curve distance metric.

12. The system of claim 7, wherein the plurality of default anchor points and a plurality of control points define an initial plurality of parametric curves spread to cover the entire received image, and wherein the initial plurality of parametric curves includes at least some parametric curves which overlap.

13. A computer program product comprising a non-transitory computer readable storage having program instructions embodied therewith, the program instructions executable by a computer, to cause the computer to perform a method comprising:
   receiving an image;
   extracting from the image a feature related to an object shown in the image;
   generating, from the extracted feature and a plurality of default anchor points, at least one selected plurality of control points and at least one selected plurality of anchor points, the at least one selected plurality of control points and the at least one selected plurality of anchor points together representing at least one parametric curve bounding the object shown in the image, wherein a number of the at least one selected plurality of control points is small; and outputting the at least one selected plurality of control points and the at least one selected plurality of anchor points representing the at least one parametric curve.

14. The computer program product of claim 13, wherein extracting the feature is performed using a regression model.

15. The computer program product of claim 14, further comprising: optimizing a match between a ground truth of the object shown in the image and the at least one predicted parametric curve defined by the at least one selected plurality of anchor points and by the at least one selected plurality of control points using a loss function and varying the locations of the at least one selected plurality of anchor points and varying the values of the at least one selected plurality of control points.

16. The computer program product of claim 15, wherein the loss function comprises one of a curve similarity metric calculated at curve-space or a curve similarity metric calculated at a selected finite resolution of the at least one parametric curve, comprising at least one of a Frechet distance, a Hausdorff distance, a Bottleneck distance, and a Lie Algebra based metric.

17. The computer program product of claim 13, wherein the plurality of default anchor points and a plurality of control points define an initial plurality of parametric curves spread to cover the entire received image, and wherein the initial plurality of parametric curves includes at least some parametric curves which overlap.

* * * * *